United States Patent [19]

Hirschson

[11] 3,842,436

[45] Oct. 22, 1974

[54] METHOD OF FORMING A POCKET IN THE MANUFACTURE OF NECKTIES

[76] Inventor: David Hirschson, 25 Lindsfield Dr., Johannesburg, South Africa

[22] Filed: Apr. 26, 1971

[21] Appl. No.: 137,446

[30] Foreign Application Priority Data
Apr. 24, 1970 South Africa...................... 70/2749

[52] U.S. Cl. .................................. 2/157, 156/306
[51] Int. Cl. ..................... A41d 25/00, A41d 25/16
[58] Field of Search ........ 156/306; 2/144, 145, 146, 2/147, 157

[56] References Cited
UNITED STATES PATENTS

| | | | |
|---|---|---|---|
| 1,180,834 | 4/1916 | Frank...................................... | 2/146 |
| 1,972,923 | 9/1934 | Dreyfus............................... | 156/306 |
| 2,016,126 | 10/1935 | Starkey................................... | 2/146 |
| 2,126,835 | 8/1938 | Steinberger............................. | 2/146 |
| 2,126,836 | 8/1938 | Steinberger............................. | 2/146 |
| 2,611,900 | 9/1952 | Hertz...................................... | 2/146 |
| 2,825,903 | 3/1958 | Miller ..................................... | 2/146 |

FOREIGN PATENTS OR APPLICATIONS 290,113 5/1928 Great Britain.......................... 2/146

Primary Examiner—Ronald H. Smith
Assistant Examiner—John R. Miller
Attorney, Agent, or Firm—Kenyon & Kenyon Reilly Carr & Chapin

[57] ABSTRACT

A method of manufacturing articles of clothing from heat fusible textile material comprising the accurate location of pieces of material relative to each other and heat fusing the pieces of material together along a line to form a seam by clamping the pieces of material between an electrically heated wire and a cooperating surface.

3 Claims, 4 Drawing Figures

PATENTED OCT 22 1974   3,842,436

INVENTOR
DAVID HIRSCHSON
BY
Kenyon & Kenyon Reilly Carr & Chapin
ATTORNEYS

METHOD OF FORMING A POCKET IN THE MANUFACTURE OF NECKTIES

This invention relates to the manufacture of articles of clothing and more specifically to those manufactured from material including heat fusible synthetic filaments.

Many articles are today made from material of the type above referred to which is generally thermoplastic and these materials are usually sewn or stitched to form articles of clothing in the conventional manner. This is often a tedious and frequently skilful operation in order to obtain the desired results.

It is the object of this invention to provide an alternative method of manufacture which may be effected with less skill than is now required to obtain accurately joined pieces of material.

According to this invention there is provided a method of manufacturing articles of clothing from heat fusible textile material comprising the accurate location of pieces of material relative to each other and heat fusing the pieces of material together along a line to form a seam.

Further features of the invention provide for the pieces of material to be located on a supporting surface therefor, for the surface to include a jig formation and for the heat fusing to be effected using an electronically heated wire, roller or the like.

The invention particularly provides for the manufacture of neckties with the pocketing effected in the manner defined above.

The invention also provides apparatus for the manufacture of articles of clothing, in particular neckties comprising a base having a raised area with a deep groove extending thereacross and electrically heated straight lengths of wire against which pieces of material to be interconnected are to be clamped during use of the apparatus, the wires when in the operative position extending at equal angles to the groove.

Further features of the invention provide for the wires to be carried on an arm having a right angle bend therein and adapted to be clamped down onto said raised area of the base, for the clamping action to be solenoid operated and for a blunt edged blade to be provided for urging material into the groove.

Still further features of the invention will become apparent from the following description of a preferred embodiment thereof. In this description reference is made to the accompanying drawings in which.

Figure 1:
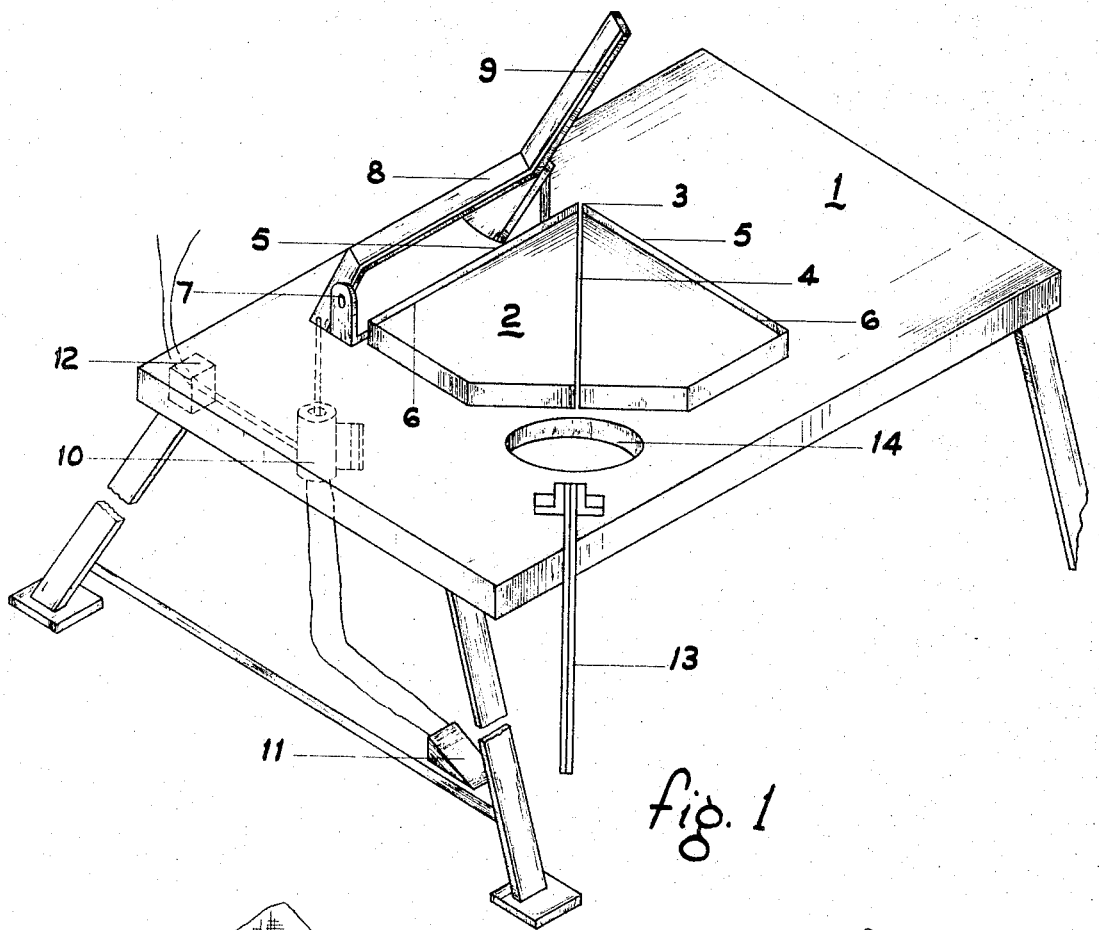
FIG. 1 is an isometric view of the apparatus used.

In this embodiment of the invention the manufacture of neckties will be described and in particular the securing of a lining or facing which is generally called the pocket of a necktie to the actual tie portion of the necktie which carries the design.

The apparatus in this case comprises a table 1 having a raised portion or jig 2 thereon. This jig has at least one right angled corner 3 from which a deep groove 4 extends diagonally, the groove conveniently having the top surface of the table 2 as its lowermost wall.

The two edges 5 of the jig defining the right angle each have a layer of suitable substance 6 extending there-along, the substance being of the type which enables material to be heat fused by clamping it between this layer and a heated element.

Mounted adjacent the raised portion 2 on horizontal pivots 7 is an arm 8 having a right angled bend therein, the pivot axes being parallel to one portion of the arm. This arm is provided with an electrically heated wire 9 following the path of the arm which is arranged to be swung downwardly onto the raised portion with the wire bearing onto the layer 6 above referred to.

Operation of the arm is preferably effected through the action of a solenoid 10 and foot operable switch 11 but the arm may be mechanically linked to a foot operable pedal or may even be hand operated. In any event there is preferably incorporated in the circuit a timing switch 12 arranged to allow just sufficient electricity to flow through the wire 9 to effect the desired fusing of the pieces of material together. It will be understood that the arm may be replaced by a vertically movable clamp which may carry the heating wires.

Finally, there is provided a blunt edged blade 13 pivotally mounted onto the table 1 to be swung into and out of the groove 4 and a hole 14 in the table through which the major portion of a tie will extend whilst the pocket is secured thereto.

Figure 2:
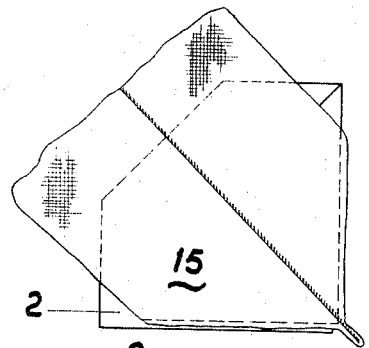
FIGS. 2, 3 and 4 are diagrammatic views illustrating the method of the invention.
Figure 3:
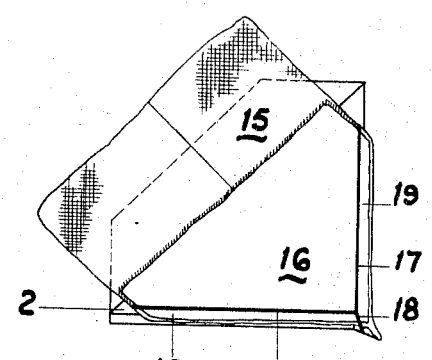

In use the end 15 of a tie is laid face upwards over the raised portion such that the groove 4 is parallel to the length of the tie and the pointed end overlaps the layers 6 on the raised portion. The blunt edged blade is then rotated into the groove thereby urging the central portion of the tie into the groove into the position illustrated in FIG. 2 to form a pleat along the longitudinal axis of the tie. The blade is then removed leaving the tie in this position and the pocket portion 16 is placed flat over the tie facing downwards. The arm is then operated fusing the two pieces of material together along lines of heat (indicated by numeral 17) at right angles to each other.

The tie with pocket secured thereto is then removed and the portions of the tie which were doubled over in the groove are then fused together along a line of heat 18 on a separate simple heat sealing machine (not shown).

Figure 4:
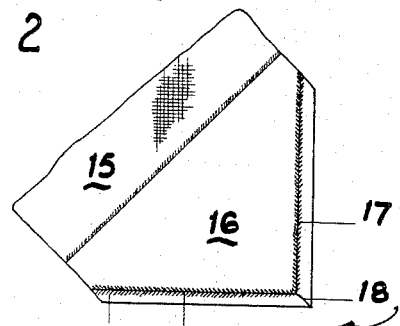

It is envisaged that at least the end of the raised portion may be made movable and provided with a short heat sealing wire to enable this fusing process to be performed whilst the tie is still located in the groove, thereby eliminating the separate fusing operation. In any event all three lines of heat intersect at the point of the pocket and the heating wires are such that the material is substantially "cut" along the lines of heat. Thus the excess material 19 may simply be removed and the end of the tie turned inside out to provide the finished tie pocket assembly illustrated in FIG. 4.

It will be appreciated that the above-described operation may be swiftly and easily effected using unskilled operators thereby resulting in an inexpensive operation.

It will be understood that the invention may be applied to any types of heat fusible cloths which contain at least an appreciable amount of heat fusible fibres and has been found to be particularly suitable when used on polyester cloths. It is envisaged that the invention will operate effectively even on cloths containing cotton or the like in which case the molten material from the heat fusible fibres will tend also to lock onto the cotton or other threads.

Also the scope of the invention is not confined to the manufacture of ties. Thus, by the use of a suitable arrangement of heating wires and clamping device, labels may be secured to the tie material preferably by applying the heat to the wrong side of the material whilst the label is positioned on the right side thereof.

Similarly, labels may be secured to any other articles of clothing made of a suitable cloth. Also other seams may be made in accordance with this invention in any other articles of clothing such as trouser pockets which are often made of polyester material. If required, the excess cloth adjacent the seam may be left attached to the cloth by using a larger diameter or a flat heating wire.

The invention therefore provides a useful and simple method of manufacturing clothing which may be put into operation by unskilled personnel.

What I claim as new and desire to secure by Letters Patent is:

1. In a method of forming a pocket in the manufacture of neckties comprising the steps of
    locating an end of a strip of tie material containing heat fusible fibers on a supporting surface,
    forming a pleat along the longitudinal axis of said strip of tie material,
    placing a lining over said end of the strip of material to extend across said pleat and over the edges of the pointed end of the material, and
    heat fusing the lining and material together along two lines diverging from said pleat to form a pointed end of the lining and the material.

2. A method as set forth in claim 1 wherein said pleat is closed off at the point of divergence of said two lines by heat fusing the material to itself along a line extending across said fold from the point of divergence of said two lines.

3. A method as set forth in claim 1 wherein the lining and the material are under a clamping force during said heat fusing step.

* * * * *